United States Patent [19]

Wakihara et al.

[11] Patent Number: 4,917,976

[45] Date of Patent: Apr. 17, 1990

[54] MATERIAL STRUCTURE HAVING POSITIVE POLARITY

[75] Inventors: Masataka Wakihara, Yokohama; Takashi Uchida, Funabashi, both of Japan

[73] Assignee: Japan Synthetic Rubber Co., Ltd., Tokyo, Japan

[21] Appl. No.: 366,460

[22] Filed: Jun. 15, 1989

[30] Foreign Application Priority Data

Jun. 16, 1988 [JP] Japan ................................. 63-148978

[51] Int. Cl.$^4$ ........................ H01M 4/58; H01M 4/04
[52] U.S. Cl. ................................... 429/218; 29/623.5; 429/220; 252/182.1
[58] Field of Search ............... 429/218, 220, 212, 194; 29/623.5; 252/182.1; 423/518; 427/372.2, 419.1, 418

[56] References Cited

U.S. PATENT DOCUMENTS 4,789,610 12/1988 Kondo et al. ..................... 429/191

FOREIGN PATENT DOCUMENTS 207576 3/1986 Japan .

Primary Examiner—Anthony Skapars
Attorney, Agent, or Firm—Oblon, Spivak, McClelland, Maier & Neustadt

[57] ABSTRACT

A material structure having positive polarity is disclosed. The material is produced by providing a structure wherein a mixture comprising (i) a copper Chevrel phase compound represented by the general formula:

$$Cu_xMo_6S_{8-y} \qquad (1)$$

(wherein $x=2$ to 4 and $y=0$ to 0.25) and (ii) a high polymeric organic compound, filled in the open sections of a reticulate material sheet, at least the surface of which is formed of copper, and by heating said structure in a gas containing sulfur. The material structure is easily handled industrially, with superior productivity and exhibits a high energy density, and is suitable for use as a cathode component for primary and secondary batteries.

10 Claims, 1 Drawing Sheet

MATERIAL STRUCTURE HAVING POSITIVE POLARITY

BACKGROUND OF THE INVENTION

1. Field of the Invention

The present invention relates to a material structure having positive polarity, and, in particular, to a material structure having positive polarity capable of providing a high energy density and suitable for use as a cathode of both primary and secondary batteries.

2. Description of the Prior Art

Conventionally, in a battery using a Chevrel phase compound as a cathode component, the Chevrel phase compound is used in the form of a compressed powder. The energy density of such a cathode is low, being approximately 160 Wh/kg. In Japanese Patent Laid-open No. 207576/1986 a method for compounding a thin film of a high energy density Chevrel phase compound is presented. According to this method a Chevrel phase compound dispersed in an organic solvent is applied to a substrate, and then subjected to sintering. However, there are drawbacks to this method; e.g. the degree of adhesion of the Chevrel phase compound to the substrate is not sufficient, the process is difficult to use industrially, and the energy density is not high enough, not exceeding 1,000 Wh/kg. Because of this, a material exhibiting positive polarity which can be industrially applicable and provides a good efficiency is desired.

SUMMARY OF THE INVENTION

An object of the present invention is to provide, with due consideration to the drawbacks of such conventional materials, a material structure having positive polarity which has a high energy density and can be easily handled industrially and applicable to such usages as a cathode component of batteries, and the like.

This object is achieved in the present invention by the provision of a material structure having positive polarity which is produced by providing a structure wherein a mixture comprising (i) a copper Chevrel phase compound represented by the formula:

$$Cu_xMo_6S_{8-y} \tag{1}$$

(wherein x=2 to 4 and y=0 to 0.25) and (ii) a high polymeric organic substance, filled in the open sections of a reticulate material sheet, at least the surface of which is formed of copper, and by heating said structure in a gas containing sulfur.

These and other objects, features, and advantages of the present invention will become more apparent from the following description of the preferred embodiments taken in conjunction with the accompanying drawings.

DETAILED DESCRIPTION OF THE INVENTION AND PREFERRED EMBODIMENTS

Figure 1:
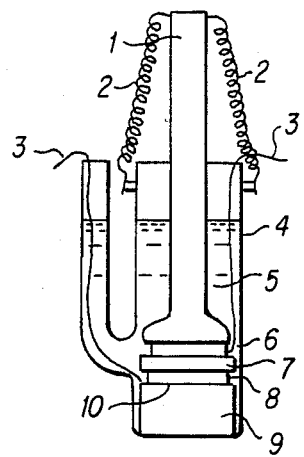
FIG. 1 is a cell used in a lithium battery, comprising a pyrex rod 1, a retaining spring 2, a nickel wire 3, a pyrex tube 4, an electrolyte 5 (4M lithium perchlorate/propylene carbonate), an anodic material 6 (lithium-aluminum), a separator 7 (filter paper), a cathodic material structure 8, a pyrex disc 9, and a stainless steel guide 10.

The copper Chevrel phase compounds used in this invention are those used as a cathode component of batteries and having a chemical formula:

$$Cu_xMo_6S_{8-y} \tag{1}$$

(wherein x=2 to 4 and y=0 to 0.25). There are no particular restrictions as to the shape and diameter of the copper Chevrel phase compounds. In order to ensure that the sintering by heating proceeds quickly and that the structure has a large surface area, it is desirable to use the material in the form of a powder with a small particle size. A preferable particle size, is for example, 300 mesh (Tyler Standard) or less, and particularly preferably 400 mesh (Tyler Standard) or less.

The high polymeric organic substance used in the present invention acts as a binder within the copper Chevrel phase compound itself and between the copper Chevrel phase compound and the reticulate material sheet. It imparts a remarkable improvement to the mechanical strength of the material having positive polarity through sintering by heating. Materials which can be used as the a high polymeric organic compound in the present invention are, for example, 1,4-polybutadiene, natural rubber, polyisoprene, styrene-butadiene copolymer (SBR), acrylonitrile-butadiene copolymer (NBR), styrene-butadiene-styrene block copolymer (SBS), styrene-isoprene-styrene block copolymer (SIS), styrene-ethylene-butylene-styrene block copolymer (SEBS), styrene-ethylene-propylene block copolymer, (SEP), butyl rubber, phosphazene rubber, polystyrene, 1,2-polybutadiene, and the like. These materials can be used individually, or two or more types can be mixed and used.

The reticulate material sheet used in the present invention may be made of, for example, a non-conductive substance such as silica, alumina, glass or the like; a conductive substance such as activated carbon or a conductive metallic substance such as copper, nickel, titanium, stainless steel, or the like, and at least surface thereof is formed of copper. This reticulate material sheet increases the mechanical strength of the material structure and also acts as a current collecting body, when the material is used as a cathode component for batteries. A suitable range for the opening ratio of the reticulate material sheet is 25 to 60%. Here, the opening ratio is defined as the percentage of total open area per unit area of the reticulate material sheet. Taking into consideration the strength of the reticulate material sheet itself and the desired slimness of the battery or other devices to which the product is applied, the thickness of the reticulate material sheet is desirably in the range of 50 to 400 μm. There are no particular restrictions with respect to the diameter of the open sections of the reticulate material sheet, provided that the openings can be easily filled with the mixture of the copper Chevrel phase compound and the high polymeric organic compound, and that the reticulate material sheet can hold the filled mixture. A range of 100 to 400 μm is desirable.

In the case of a non-woven fabric, a suitable range for weight per unit area is from 50 to 500 gm/m².

It is desirable for the surface of the reticulate material sheet to be subjected to a sulfurization treatment, for example, by heating at 200 to 400° C. in a gas containing a sulfur compound so that a sulfide layer is formed. This improves the adhesion between the heat-sintered copper Chevrel phase compound and the reticulate material sheet. This sulfide layer is usually a $Cu_2S$ phase. The copper sulfide can react as an electrode substance. The thickness of the sulfide layer should be such that the mechanical strength and electric conductivity of the reticulate material sheet do not extremely decline. A suitable thickness of the sulfide layer is, for example, 1 to 10 $\mu$m, and preferably between 3 to 5 $\mu$m.

The following methods can be given as typical methods of filling the mixture of the copper Chevrel phase compound and high polymeric organic compound into the openings in the reticulate material sheet.

(1) Heating the organic high molecular compound in an inert gas to convert it into a liquid or semi-liquid state, into which the copper Chevrel phase compound is dispersed by kneading, followed by rolling the mixture onto the reticulate material sheet by means of an applicator bar or the like to effectuate filling.

(2) Preparing a polymer solution by dissolving the high polymeric organic substance in an organic solvent and adding the copper Chevrel phase compound to the solution, followed by stirring and kneading. The material thus produced is filled into the reticulate material sheet using an applicator bar or the like, and dried. The volume fraction of the copper Chevrel phase compound in the mixture of the copper Chevrel phase compound and the organic high molecular compound or the polymer solution is preferably 75-95%.

The amount of this material filled at this time is normally about 1.2 to 3 mg/cm$^2$. In this case it is desirable to provide a 5 to 50 $\mu$m layer of the above mixture on both the top and bottom of the reticulate material sheet.

The organic solvent used in the filling method (2) outlined above provides for uniform mixing of the high polymeric organic compound and the copper Chevrel phase compound, for adjustment of the filling characteristics of the mixture, and for adjustment of the film thickness of the sheet after filling and drying. The organic solvent is desirably non-water-absorptive so that no water is absorbed by the copper Chevrel phase compound. Suitable organic solvents which can be used are, for example, saturated hydrocarbons, aromatic hydrocarbons, halogenated hydrocarbons, esters, or the like. Specific examples are n-hexane, n-heptane, n-octane, cyclohexane, benzene, toluene, xylene, ethyl acetate, trichloroethylene, etc.

It is essential that the heating in the present invention be performed in a gas containing a sulfur compound. Hydrogen sulfide is desirable as this sulfur compound. Further, it is desirable that the partial pressure of the sulfur compound in the gas be controlled so as to avoid oxidation of the copper Chevrel phase compound. For this purpose, the gas is diluted with a reducing gas such as hydrogen or the like or an inert gas such as nitrogen, argon, or the like. The higher the partial pressure of sulfur (Ps) in the gas the greater the degree of sintering under heat. When the partial pressure of the sulfur is greater than $10^{-12}$ atm, however, the copper Chevrel phase compound is readily decomposed. The ratio of hydrogen sulfide to the reducing gas or inert gas is preferably in the range from 1:1,000 to 1:450, with a particularly preferable range being from 1:550 to 1:450.

A preferable temperature for the heating is 300° to 700° C., with an especially preferable range being from 500° to 700° C. If the temperature is lower than 300° C., the rate of sintering is low. If the temperature exceeds 700° C., on the other hand, decomposition of the copper Chevrel phase compound may occur.

It is desirable to set a heating time which allows the high polymeric organic compound to be adequately decomposed by the heat. It is possible to drastically improve the energy density of the material structure of the present invention by this heating process, when the structure is applied to a cathodic component.

Typical usage of the material structure of the present invention is for a cathode component of batteries. Examples of batteries which can use the material structure are lithium, potassium, sodium, copper, silver, zinc, iron, and nickel batteries, or the like. Lithium batteries are particularly suitable.

Other features of the invention will become apparent in the course of the following description of the exemplary embodiments which are given for illustration of the invention and are not intended to be limiting thereof.

EXAMPLES

EXAMPLE 1

A copper Chevrel phase compound $Cu_{3.5}Mo_6S_{7.95}$ was pulverized in an agate mortar and screened to obtain particles of a diameter which passed through a 400 mesh screen (Tyler Standard).

30 g of this copper Chevrel phase compound was mixed into a solution prepared by adding 5.4 g of a 10% by weight SEBS-toluene solution and 1.5 g of a 10% by weight SBS-toluene solution to 10 g of toluene, and the mixture was stirred for 90 minutes in a ball mixer. The resulting mixture was designated as Mixture A.

The Mixture A was filled into a reticulate material sheet, for which the surface had been subjected to a sulfurization treatment, using an applicator bar with a 250 $\mu$m gap, and dried for 4 hours in a vacuum chamber. The reticulate material sheet had an opening ratio of 38%, a thickness of 225 $\mu$m, and a mesh diameter of 250 $\mu$m. This body was heated to 300° C. over 10 minutes in a mixed gas of hydrogen sulfide and hydrogen at a ratio of 1:300 by volume. The surface was sulfurized to form a copper sulfide layer of a 4 $\mu$m thickness.

The structure filled with this mixture was cut out to produce disks of a 5 mm diameter. After weighing, disks were inserted into a transparent electric furnace (made by the Thermo Riko Co.). First the furnace was flushed with nitrogen gas for 30 minutes, then a mixture of hydrogen sulfide and hydrogen at a ratio of 1:500 by volume was passed through it for 30 minutes, after which power was applied to the heater. After a temperature of 500° C. was reached in the furnace, the structure was heated for 10 minutes at 500° C., the power to the heater was cut, and the disks were left in the furnace to cool. When the temperature in the furnace had dropped to about 100° C., the inside of the furnace was flushed with nitrogen gas for 30 minutes, then the disk shaped material structures having positive polarity were removed from the furnace.

A cell for use in the lithium battery shown in FIG. 1 was fabricated from the material structure having positive polarity obtained by the above method. This cell was discharged at a current density of 0.5 mA/cm$^2$ to measure the energy density.

Figure 2:
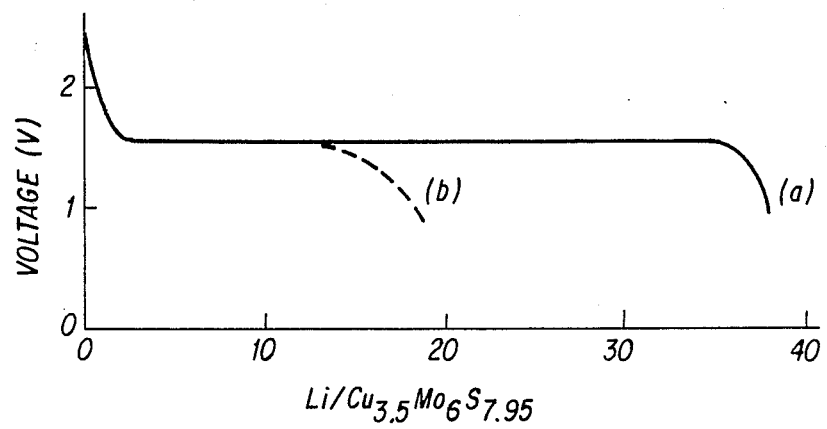
FIG. 2 is a graph showing the energy density of a cathodic material structure of this invention.

The results are shown by the solid line (a) in FIG. 2. The Y-axis in FIG. 2 represents voltage; the X-axis shows the number of intercalated lithium atoms for one mol of the copper Chevrel phase compound, calculated from the quantity of electricity discharged from the lithium battery. For the material structure having positive polarity obtained in this example of the present invention 38 lithium atoms were transferred for one discharge. The energy density was 1200 Wh/kg for 1 kg of copper Chevrel phase compound.

COMPARATIVE EXAMPLE 1

A copper Chevrel phase compound was added to 15 cc of propylene glycol and uniformly dispersed in the ball mill. This mixture was used in place of the mixture A of Example 1. In all other respects the method used was the same as in Example 1. The structure was fabricated and sintered so that a material structure having positive polarity was obtained.

For the material structure having positive polarity obtained in this Comparative Example, 18 lithium atoms per mol of copper Chevrel phase compound were intercalated for one discharge. [the dotted line (b) in FIG. 2]. The energy density was 570 Wh/kg.

Obviously, numerous modifications and variations of the present invention are possible in light of the above teachings. It is therefore to be understood that within the scope of the appended claims, the invention may be practiced otherwise than as specifically described herein.

What is claimed is:

1. A material structure having positive polarity which is produced by providing a structure wherein a mixture comprising (i) a copper Chevrel phase compound represented by the general formula:

$$Cu_xMo_6S_{8-y} \qquad (1)$$

(wherein $x=2$ to 4 and $y=0$ to 0.25) and (ii) a high polymeric organic compound, filled in the open sections of a reticulate material sheet, at least the surface of which is formed of copper, and by heating said structure in a gas containing sulfur.

2. The material structure according to claim 1, wherein particle size of said copper Chevrel phase compound is 300 mesh (Tyler Standard) or less.

3. The material structure according to claim 1, wherein said high polymeric organic compound is one or more members selected from 1,4-polybutadiene, natural rubber, polyisoprene, styrene-butadiene copolymer, acrylonitrilebutadiene copolymer, styrene-butadiene-styrene block copolymer, styrene-isoprene-styrene block copolymer, styrene-ethylene-butylene-styrene block copolymer, styrene-ethylene-propylene block copolymer, butyl rubber, phosphagene rubber, polystyrene, and 1,2-polybutadiene.

4. The material structure according to claim 1, wherein said reticulate material sheet has an opening ratio of is 25 to 60%.

5. The material structure according to claim 1, wherein the surface of the reticulate material sheet is treated with a gas containing a sulfur compound to form a sulfide layer.

6. The material structure according to claim 1, wherein said heating is performed at a temperature of 300° to 700° C. in a gas containing a sulfur compound.

7. The material structure according to claim 6, wherein said gas containing sulfur compound is a hydrogen sulfide-containing gas diluted with a reducing gas or an inert gas.

8. The material structure according to claim 7, wherein the ratio of hydrogen sulfide to the reducing gas or inert gas is range from 1:1,000 to 1:450.

9. A cathode component for batteries which is produced by providing a structure wherein a mixture comprising (i) a copper Chevrel phase compound represented by the general formula:

$$Cu_xMo_6S_{8-y} \qquad (1)$$

(wherein $x=2$ to 4 and $y=0$ to 0.25) and (ii) a high polymeric organic compound, filled in the open sections of a reticulate material sheet, at least the surface of which is formed of copper, and by heating said structure in a gas containing sulfur.

10. A process for preparing material structure having positive polarity comprising:
preparing a polymer solution by dissolving a high polymeric organic compound in an organic solvent and adding a copper Chevrel phase compound to the solution, followed by stirring and kneading,
filling said polymer solution in the open sections of a reticulate material sheet, at least the surface of which is formed of copper,
drying said reticulate material sheet filled with said solution, and
heating said reticulate material sheet filled with said solution in a gas containing sulfur.

* * * * *